Figure 1:
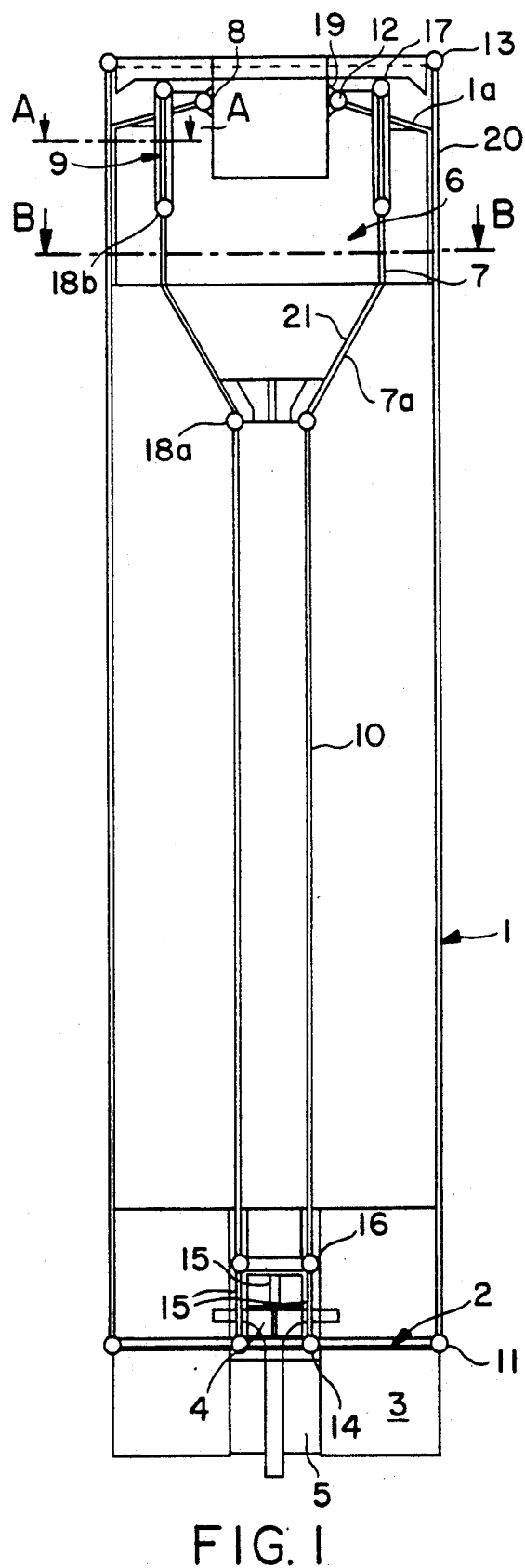

United States Patent [19]

Hassinen

[11] Patent Number: 5,117,770
[45] Date of Patent: Jun. 2, 1992

[54] COMBUSTION UNIT

[75] Inventor: Toivo Hassinen, Kuopio, Finland

[73] Assignee: Tampella Power Oy, Tampere, Finland

[21] Appl. No.: 647,665

[22] Filed: Jan. 29, 1991

[30] Foreign Application Priority Data

Jan. 29, 1990 [FI] Finland .................................. 900438

[51] Int. Cl.$^5$ ............................................... F23G 5/00
[52] U.S. Cl. ................................ 110/245; 110/216; 122/4 D
[58] Field of Search ................. 122/4 D; 110/245, 216

[56] References Cited

U.S. PATENT DOCUMENTS

| | | |
|---|---|---|
| 4,709,663 | 12/1987 | Larson et al. .................... 122/4 D |
| 4,809,623 | 3/1989 | Garcia-Mallol .................. 110/245 |
| 4,947,803 | 8/1990 | Zenz ................................ 122/4 D |
| 4,951,612 | 8/1990 | Gorzegno ......................... 122/4 D |
| 4,979,448 | 12/1990 | Sheely et al. ..................... 110/245 |
| 5,005,528 | 4/1991 | Virr .................................. 122/4 D |

Primary Examiner—Henry C. Yuen
Attorney, Agent, or Firm—Pollock, Vande Sande & Priddy

[57] ABSTRACT

Combustion unit which for attaining a circulation process comprises a reactor chamber (1) and a particle separator (6) which is provided with two casings (7, 8) and which is placed inside the reactor chamber to the upper part thereof. At least the first i.e. the outer casing (7) of the particle separator (6) is arranged to form a heat transfer surface. The roof structure (1a) of the reactor chamber (1) is attached to the outer casing (8).

7 Claims, 2 Drawing Sheets

COMBUSTION UNIT

The invention relates to a combustion unit more closely defined in the ingress part of claim 1. The combustion unit mainly comprises a reactor chamber accommodating at least one particle separator. The reactor chamber is placed essentially in a vertical position. At least the vertical wall structure of the reactor chamber is arranged to form a heat transfer surface. The heat transfer surface is formed of a tubular structure, flow of a heat transfer medium being arranged inside. An exothermic combustion reaction, a so-called fluidized bed, is arranged to take place at the lower part of the reactor chamber by means of fuel and air supplies and released flue gases containing solid material flow upwards in the reactor chamber. The particle separator is a so-called cyclone separator having two vertical and essentially coaxial casings, one placed essentially inside the other. The first i.e. the outer casing is provided with a flue gas inlet. Further, the first casing is provided, at the lower part thereof and preferably connected by a tapered portion, with a return duct for the solid material separated in the particle separator from the flue gases for returning the solid material to the lower part of the reactor chamber. The second i.e. the inner casing is, at the upper part thereof, connected to the subsequent process stage for carrying the flue gases essentially free of solid material through said inner casing to said process stage.

A combustion unit of this type can be regarded as essentially known from the following reference: F. A. Zenz, Fluidization and Fluid Particle Systems, Pemm-Corp. Publications, vol. II, Draft 1989, pages 333-334. This publication deals with a so-called bubbling fluidized bed reactor. Due to its structure and flow properties, the presented reactor is, however, so inconvenient that there are no existing practical applications, especially such applications where the reactor chamber would accommodate a particle separator.

It can be generally stated that fluidized bed boilers based on circulation reaction technique, to which technique also the present invention belongs, are becoming more and more popular in technical applications since they enable reduction of sulfuric and nitrogen oxide emissions to legitimate levels at very low costs. Especially with sulphur containing fuels the economy of the circulation reactor is excellent if the heat power of the plant is lower than 200 MW. In technical applications, the primary purpose of the combustion is the production of thermal energy which is further conducted to the heat transfer medium of the reactor chamber, which is usually water. Therefore, the walls of the reactor chamber usually contain a tubular structure formed by several parallel tubes and finlike units connecting together the tubes and forming a gas tight panel structure. Traditionally, particle separators and return system for solid material are structures placed separately from the circulation reactor chamber. The particle separator and the return system normally comprise an outer steel supporting structure and an inner ceramic layer which is to insulate the steel structure from the hot particle-gas suspension. The advantage in this kind of construction is the structural simplicity of the reactor and the particle separator. A great deal of experience has accumulated on its practicability in practical applications. The drawback in the traditional constructions is the large space required since both the reactor chamber and particle separator are, in these constructions, about equal in main dimensions and they must be placed, for constructional reasons, far from each other. This brings about the drawback that the return system for the solid material becomes complicated in design because it must have a separate system for controlling the gas flow which system, in practice, is realized by a separate fluidized bed disposed in the return duct.

A heat transfer surface that is formed from the first i.e the outer casing is known from the publication U.S. Pat. No. 4,746,337, which publication, however, deals with a separate cyclone separator, where the tubular structure of the first i.e. the outer casing is connected to the second i.e. the inner casing in order to obtain a roof structure for said cyclone separator. In conventional technique, joining of a reactor chamber, which functions as a heat transfer surface, and an insulated particle separator together has presented a serious problem due to their different behavior in thermal expansion. It is obvious that a massive particle separator containing ceramic parts of appr. 300 mm in thickness must be supported on the bottom plane and must be provided with a self-supporting steel casing. The reactor chamber with panel structures is preferably supported from above and therefore thermal expansion takes place mainly downwards. In operation, temperature of the reactor chamber in a conventional circulation reactors is typically about 300° C. whereas the supporting steel casing of a particle separator must be maintained at 80° C. maximum, at the highest, for safety reasons and for minimizing heat losses. Therefore, it is clear that conventional circulation reactors suffer from severe movements due to temperature changes during starting up and running down.

The object of this invention is to present a combustion unit which, in applications based on circulation technique, provides an advantageous design for a combustion unit both from a constructional viewpoint and from the flow properties in cases when the particle separator is to be placed inside the reactor chamber. Therefore, it is an object of this invention to upgrade the prior art in the field.

To obtain these objectives the combustion unit according to the invention is primarily characterized in what is presented in the ingress part of claim 1.

The combustion unit according to the invention brings about a construction which realizes a gas tight roof structure and which is economical to manufacture and which effectively solves the supporting problems as a whole and those associated with the inner casing in particular Some advantageous embodiments of the combustion unit according to the invention are presented in the enclosed subclaims.

The invention will now be further illustrated by referring to the enclosed drawings. In the drawings, FIG. 1 shows a vertical cross-sectional view of the combustion unit according to the invention taken along the centre line and FIG. 2 shows a cross-sectional view of the upper part of the combustion unit in a larger scale.

Figure 2:
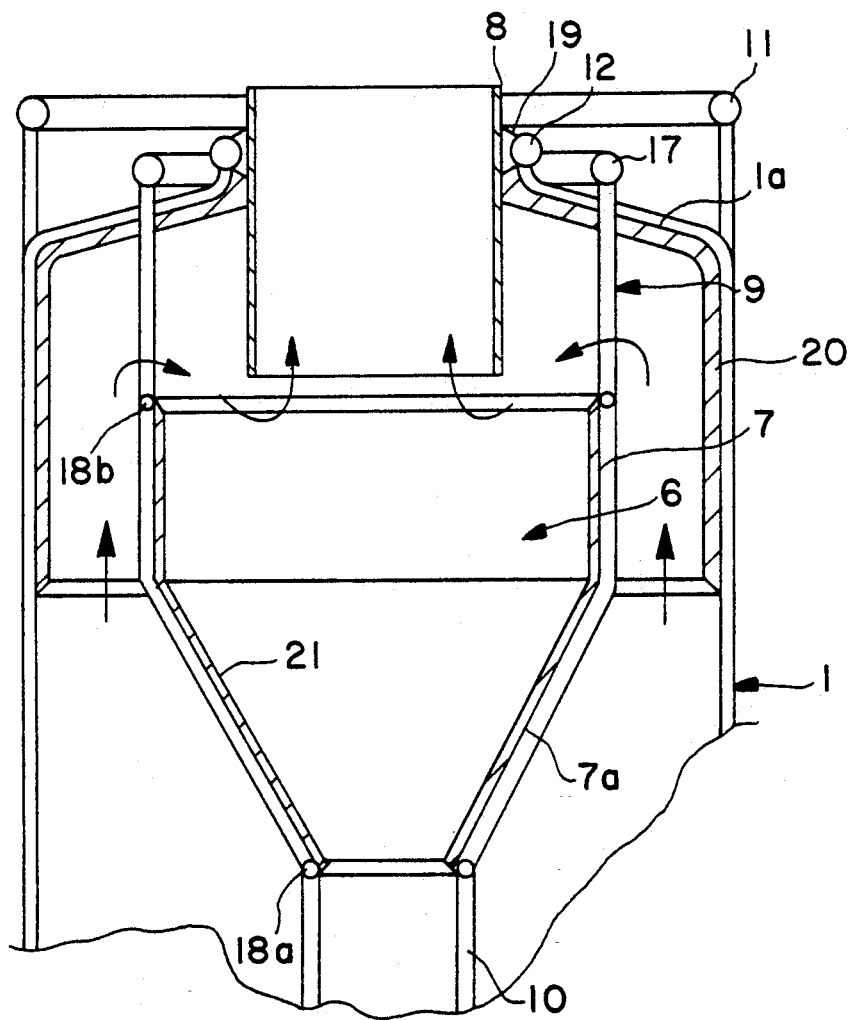

The main parts of the unit can be seen in FIGS. 1 and 2. A cylindrical reactor chamber 1 with a circular cross-section is placed in a vertical position. The wall structure constituting the casing of the reactor chamber is essentially formed into a heat transfer surface comprising of a plurality of tubes and extending at least along the vertical part of the wall structure. The heat transfer medium is arranged to flow inside the tubular structure. In the lower part of the reactor chamber 1 there is a grate structure 2 provided with a combustion air supply by using e.g. a conventional nozzle system (not shown). For this purpose, there is provided a so-called air cabinet 3 through which the combustion air is conducted to the nozzle system. Furthermore, in connection with the grate there is provided with a fuel supply device 4 and an outlet 5 for the coarse material.

On top of the grate structure 2 the fluidized bed is formed and the flue gases generated therein flow upwards carrying away solid material.

Inside the upper part of the reactor chamber 1, there is a particle separator 6 having the first i.e. the outer casing 7 and the second i.e. the inner casing 8 which both have a circular horizontal cross-section and whose centre lines are arranged essentially to coincide and preferably to coincide with the centre line of the reactor chamber 1. The first i.e. the outer casing 7 is provided with an flue gas inlet. The lower part of the first i.e. the outer casing 7 is provided with a tapered portion 7a which is symmetric with respect to the centre line, and the vertical return duct 10, having preferably a circular cross-section and its centre line coinciding with that of the reactor chamber 1, is connected to the lower part of the first i.e. the outer casing. The return duct 10 extends in the vertical direction from the lower part of the first i.e. the outer casing to the lower part of the reactor chamber 1 to the fluidized bed zone.

The second i.e the inner casing 8 of the particle separator is, in the vertical direction, essentially shorter than the first i.e. the outer casing 7 and it has an essentially tubular form and its upper part is connected to the process stage subsequent to the combustion unit for transferring the flue gases free of solid material through said second i.e. the inner casing 8 to said process stage subsequent to the combustion unit.

At least the first i.e. the outer casing 7 is arranged to form preferably a tubular heat transfer surface through which the heat transfer medium is arranged to flow. It is obvious that also the second i.e. the inner casing 8 can be arranged to form a heat transfer surface by forming it into a heat transfer surface composed of parallel tubes.

As seen particularly in FIG. 1, the tubular structure forming the wall of the reactor chamber 1, containing the heat transfer medium, is arranged to form the roof structure 1a of the whole combustion unit and then at least some of the tubes leaving the annular distributor pipe 11 in the lower part of the reactor chamber end in an annular collector pipe 12 which surrounds the second i.e. the inner casing 8 of the particle separator which casing is attached to said annular collector pipe 12 by means of a fixing part 19 which is welded in between said parts. Part of the tubes leaving said annular distributor pipe 11 can be carried straight up and connect, in the upper part of the reactor chamber, to a second annular collector pipe 13 in the upper part of the reactor chamber. Referring to FIG. 1, the annular distributor pipe 11 supplies water, which functions as the heat transfer medium, e.g. via the tubular grate structure 2 to the annular distributor pipe 14, which is located below the return duct 10, whereupon the vertical tubes 15 provide connection from the distributor pipe 14 to the second annular distributor tube 16 which is located in the lower part of the return duct 10, and then the return duct as a whole is arranged to form a heat transfer surface comprising of vertical tubes. Flow of the heat transfer medium takes place through the return duct 10 to the lower part of the first i.e. the outer casing and from there further through the tubular structure of the casing 7, through intermediate collector chambers 18a, 18b to the annular collector tube 17. The tubes of the roof structure 1a and the vertical tubes leading to the collector pipe 17 are placed in an interlocked manner relative to each other and, at least within the roof structure, the spaces between the tubes are filled with strips of plate which are welded onto the adjacent tubes of the roof structure 1a. An alternative structure for the first i.e. the outer casing 7 is presented in FIGS. 1 and 2, where there is another annular intermediate collector chamber 18b arranged close to the lower part of the flue gas inlet 9, wherefrom the spaced tubular structure extends upwards to the collector pipe 17. From the foregoing it will be evident that flow of the heat transfer medium can be simply arranged so that essentially the whole combustion unit functions as a heat transfer surface.

The flue gas inlet 9 is composed of several openings placed at specific intervals in the circumference of the first i.e. the outer casing 7, wherein the openings are of equal size and preferably rectangular and placed at the same height level. The flue gas inlet 9 is placed in the upper part of the reactor chamber immediately below the roof structure 1a of the reactor chamber 1 where the roof structure 1a functions as a blocking surface for the vertical flow of the flue gases. Depending on the size of the combustion unit, the number of said openings placed in the flue gas inlet 9 can vary between 5-30.

As seen particularly in FIG. 2 the roof structure 1a and the inner wall of the reactor chamber 1 are provided, by the location of the particle separator 6, with a layer of protective masonry 20 or the like and therefore spacing of the tubes can be increased (e.g. 150 mm) at least by the roof structure 1a without fear of having too high tube temperatures. The outer casing 7 and its conically shaped lower part can be provided with a layer of protective masonry 21.

I claim:

1. A combustion unit for a circulation process comprising:

a reactor chamber placed substantially in a vertical position, and having at least its vertical wall structure arranged to form a tubular heat transfer surface, with a flow of a heat transfer medium being arranged inside the tubular structure and an exothermic combustion reaction, a fluidized bed, being arranged to take place by means of fuel and air supplies in the lower part of the reactor chamber wherein the flue gases generated in the reaction and containing solid material flow upwards in the reactor chamber and at least one particle separator, a cyclone separator, placed inside the reactor chamber in the upper part thereof, the separator having two casings one placed substantially inside the other, their center axes being substantially coincident and in a vertical position, a first outer casing being provided with a flue gas inlet and the lower part of said first outer casing being provided with a return duct for returning the solid material separated from the flue gases to the lower part of the reactor chamber and the upper part of a second, tubular casing with open ends being connected at its upper end to the subsequent process stage for carrying the flue gases substantially free from solid material through said second inner casing to said process stage subsequent to the combustion unit, wherein at least part of the tubes of the wall structure of the reactor chamber form a roof structure of the combustion unit, said roof structure extending up to the outer surface of said second, inner casing and wherein said casing is attached to the roof structure.

2. A combustion unit according to claim 1, wherein the tubular structure of said first, outer casing penetrates said roof structure of the reactor chamber whereupon said roof structure also forms the roof structure of the particle separator within the area which is outside said second inner casing.

3. A combustion unit according to claim 1, wherein the flue gas inlet is placed in the upper part of the reactor chamber so that it extends downward starting substantially immediately from the roof structure of the reactor chamber which blocks the vertical flow of the flue gases.

4. A combustion unit according to claim 1, wherein the roof structure comprises a collector pipe which surrounds said second inner casing and wherein a fixing part is provided between said pipe and said second inner casing for fixing them together.

5. A combustion unit according to claim 1, wherein the roof structure is provided with a protective masonry.

6. A combustion unit according to claim 1, wherein the cross-section of the reactor chamber, at least at the point where the particle separator is located, is circular and wherein its center line coincides with the common center line of the first and second casings of the particle separator.

7. A combustion unit according to claim 2, wherein the roof structure is provided with a protective masonry.

* * * * *